United States Patent [19]
Conway et al.

[11] Patent Number: 5,345,482
[45] Date of Patent: Sep. 6, 1994

[54] PASSIVE CONTAINMENT COOLING WATER DISTRIBUTION DEVICE

[75] Inventors: Lawrence E. Conway, Hookstown; Susan V. Fanto, Plum Borough, both of Pa.

[73] Assignee: Westinghouse Electric Corporation, Pittsburgh, Pa.

[21] Appl. No.: 57,383

[22] Filed: May 6, 1993

[51] Int. Cl.$^5$ .................. G21C 15/18; G21C 13/00
[52] U.S. Cl. ........................ 376/299; 239/193
[58] Field of Search ............... 376/299, 298, 293; 239/193, 194; 137/561 A; 261/114.1, 114.5

[56] References Cited

U.S. PATENT DOCUMENTS

| | | | |
|---|---|---|---|
| 3,491,792 | 1/1970 | Eckert | 239/193 |
| 4,432,913 | 2/1984 | Harper et al. | 239/193 |
| 4,881,280 | 11/1989 | Lesikar | 239/193 |
| 5,049,353 | 9/1991 | Conway et al. | 376/299 |
| 5,154,353 | 10/1992 | Plachy | 239/193 |
| 5,169,596 | 12/1992 | Orr | 376/299 |

OTHER PUBLICATIONS

"Status of the AP600 Pressurized Water Reactor", Howard J. Bruschi and T. S. Anderson, Proceedings of the American Power Conference, 37711.APC, Apr., 1992.
"AP600 offers a simpler way to greater safety, operability and maintainability", Ronald Vijuk and Howard Bruschi, *Nuclear Engineering International,* Nov., 1988.

*Primary Examiner*—Daniel D. Wasil
*Attorney, Agent, or Firm*—James C. Valentine

[57] ABSTRACT

A passive containment cooling system for a nuclear reactor containment vessel. Disclosed is a cooling water distribution system for introducing cooling water by gravity uniformly over the outer surface of a steel containment vessel using a series of radial guide elements and cascading weir boxes to collect and then distribute the cooling water into a series of distribution areas through a plurality of cascading weirs. The cooling water is then uniformly distributed over the curved surface by a plurality of weir notches in the face plate of the weir box.

14 Claims, 4 Drawing Sheets

PASSIVE CONTAINMENT COOLING WATER DISTRIBUTION DEVICE

BACKGROUND OF THE INVENTION

This invention was made during the performance of Contract No. DE-AC03-90SF18495 with the United States Department of Energy by Westinghouse Electric Corporation, Pittsburgh, Pennsylvania.

This invention relates to nuclear reactors and more particularly to a passive cooling system for a steel containment vessel used to house a nuclear reactor, the steam generators and associated equipment. In U.S. Pat. No. 5,049,353 issued Sep. 17, 1991 to Westinghouse Electric Corporation, there is described a passive containment cooling system used to cool the steel containment vessel of a nuclear power plant in the event of a failure or event which results in the release of energy from the water cooled reactor. The cooling system described in this patent is the passive heat sink that removes all core decay heat from the steel containment vessel safely and rapidly and prevents any excessive pressure build-up within the steel containment vessel.

As further described in the above-mentioned U.S. Pat. No. 5,049,353, the passive containment cooling system uses a combination of natural air circulation between the steel containment vessel and the concrete shield building and gravity fed cooling water to provide the necessary cooling and heat sink. In the event of a failure of any of the primary active reactor cooling systems or an accident, the passive containment cooling system can be utilized to provide sufficient cooling to maintain and ensure containment vessel integrity.

The gravity fed cooling water used in this passive containment cooling system is derived from a large (350,000 gallon) annular tank built into the roof of the concrete shield building that surrounds the steel containment vessel, and when needed the water is allowed to flow by gravity all over the outside surfaces of the steel containment shell. Because the water is drained by the natural force of gravity, pumps and human operator action are not necessary to provide the necessary cooling effect. The cooling water storage tank is designed to provide the cooling water requirement for several days, after which additional water could be added to the tank. If no additional water is provided, the air cooling would be sufficient to remove residual heat from the steel containment vessel.

In order to provide the most efficient heat removal from the outside surface of the steel containment vessel, the passive cooling water should flow over a large portion of the containment vessel outer surface in a thin film to maximize the cooling effect of the water. Even, uniform distribution of water over the surface of the steel containment vessel is difficult due to the fact that a large steel containment vessel will still have a number of surface deviations, weld joints and other uneven areas that cause the cooling water to "channel" or otherwise not flow over the surface in a thin uniform film. These surface deviations and variations are large compared to the thickness of the desired water film. It has also been observed that if "channeling" occurs near the top of the steel containment vessel, the channel will continue on down the side of the vessel and thereby create a large area that will not be effectively cooled.

Prior attempts to provide for a uniform film of cooling water on the curved surface of the steel containment vessel have improved, but not completely solved the problem. As described in the above-mentioned U.S. Pat. No. 5,049,353, one approach to the problem was to coat the outside surface of the steel containment vessel with a special heat conductive wettable zinc-based paint. While this paint improved the flow of the cooling water as compared to a bare steel surface, and channeling still occurred.

SUMMARY OF THE INVENTION

It is therefore an object of this invention to provide a cooling water distribution system suitable for use in the passive cooling of the outside of a steel containment vessel that provides a thin, film of cooling water over a large portion of the steel containment vessel.

It is a further object of this invention to provide a cooling water distribution system that is reliable and provides a maximum cooling effect from a given volume of cooling water.

It is a still further object of this invention to provide a cooling water distribution system that is simple, easily adapted to different sizes and shapes of a steel containment vessel and manufacturing or fabricating variations in the surface of the steel containment vessel.

Other and further objects of this invention will become apparent from the following detailed description and the accompanying drawings and claims.

It has been discovered that the foregoing objects can be attained by providing a plurality of guide elements secured to the curved surface of the dome of the steel containment vessel which extend radially outwardly from the center of the dome, and downwardly from a source of cooling water stored above the dome and a plurality of weir boxes. Each weir box can be secured to the curved surface of the dome of the steel containment vessel and can extend between a first and second adjacent guide elements. Each weir box is comprised of an upper collection arm having one end thereof secured to the first guide element and the other end thereof spaced from the second adjacent guide element. The weir box has a face plate spaced just down from the collection arm with one end of the face plate secured to the second guide element and the other end thereof spaced from the first guide element. A plurality of distribution areas are created in each weir box by a plurality of spaced, substantially parallel, cross plates which extend from the face plate toward the collection arm. Each cross plate contains one or more notches to regulate cooling water flow into each distribution area. The face plate is also provided with one or more spaced notches between each adjacent cross plate to distribute spaced streams of cooling water from each of the distribution areas onto the surface of the steel containment vessel.

DESCRIPTION OF THE PREFERRED EMBODIMENT

Figure 1:
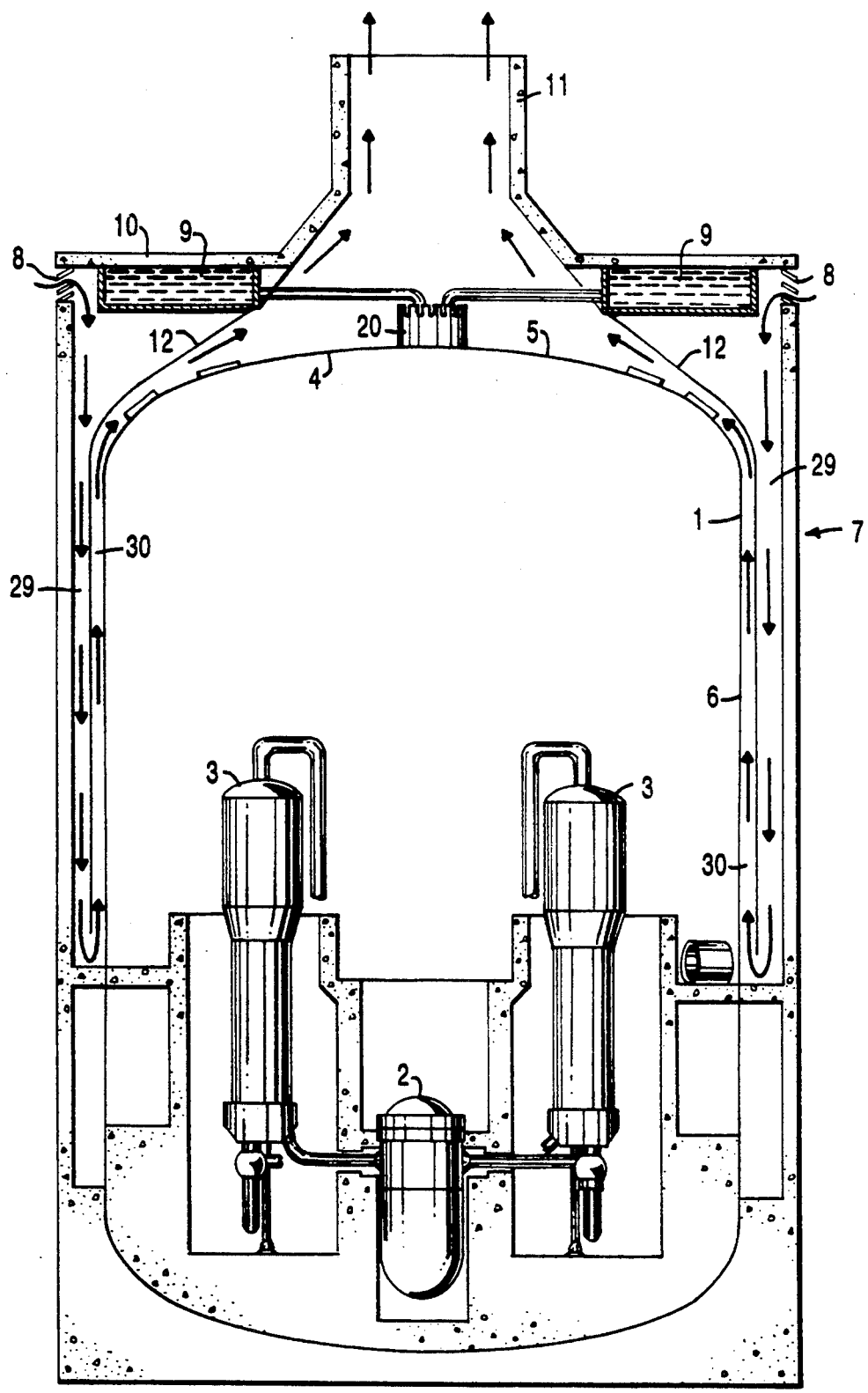
FIG. 1 is a side elevational view, partly in section, of the passive containment cooling system for a nuclear reactor power station for which the cooling water distribution system of this invention was developed.

The passive containment cooling system used in conjunction with the present invention is illustrated in FIG. 1 and is used to remove heat from a steel reactor containment vessel to the outside environment so that the containment vessel design pressure and temperature are not exceeded in the event of a problem or failure that leads to elevated pressure or temperature in the containment vessel.

As shown in FIG. 1, the passive containment cooling system includes a steel containment vessel 1 which encases a nuclear reactor 2 and steam generators 3. The steel containment vessel 1 has a spherical or ellipsoidal dome top 4 and a domed outer surface 5 and a cylindrical outer surface or sidewall 6. For a typical nuclear reactor power plant producing about 1800 megawatts and using a pressurized water nuclear reactor 2, the cylindrical sidewall 6 of the steel containment vessel may have a diameter of about 130 feet (43 meters) and a steel wall thickness of about 1.75 inches (4.44 centimeters) to withstand the required internal pressures.

A concrete shield building 7 surrounds the steel containment vessel 1 with about a 4.5 foot (137 centimeters) annular spacing between the outside cylindrical surface 6 of the steel containment vessel 1 and the inner surface of the shield building 7. The shield building 7 is provided with an air inlet 8 at the top and radially around the shield building 7. The air inlet 8 preferably consists of a series of equally spaced inlet openings provided with louvers.

A source of cooling water 9 is supported in the upper portion of the shield building 7 in a tank.

The top 10 of the shield building 7 has a central chimney 11 extending upwardly from the top 10 and provides an exhaust for the heated air and water vapor. The chimney 11 serves to increase the height of the heated air and thereby provides a higher natural circulation of air within the shield building 7. The chimney also prevents the heated air and water vapor from being drawn into the air inlet 8. In one embodiment, the chimney is about 50 feet (15 meters) above the top 10 of the shield building, or about 65 feet (19.5 meters) above the top of the steel containment vessel 1.

A steel air baffle 12 is placed between the inner wall surface of the shield building 7 and the outer wall surface 5 and 6 of the steel containment vessel 1 to define a pair of annular air spaces 29 and 30 between the steel containment vessel 1 and the shield building 7 and provide for an effective and efficient flow of air to assist in the cooling of the containment vessel 1. As illustrated in FIG. 1 by arrows, outside ambient air is drawn in to the shield building 7 through the air inlets 8 and flows downwardly through the outer annular space 29 and then upwardly through the inner annular space 30 while passing over the outer surface 5 and 6 of the steel containment vessel 1 before it is discharged out through the central chimney 11.

For conditions of elevated pressure and temperature in the containment vessel 4, containment cooling provided by this natural draft of outside cooling air can be supplemented by applying cooling water to the containment outer surfaces 5 and 6. Therefore, the present invention is directed to operation of the passive containment cooling system when cooling water is supplied to the outer surfaces 5 and 6 of the steel containment vessel 1 from a gravity source of cooling water 9 located in the top 10 of the shield building 7. The cooling water will initially cool the outer surface 5 by direct conductive heat transfer. As the cooling water heats up, it begins to evaporate into the upwardly flowing stream of cooling air. This creates an evaporative cooling action which will cool the outer surface 5 and 6 of the steel containment vessel 1 well below the normal boiling point of water at the expected moderate heat fluxes.

The release of cooling water from the source of cooling water 9 in the top of the shield building 10 is intended to provide cooling capability for several days, after which it is expected the water supply could be replenished.

Figure 2:
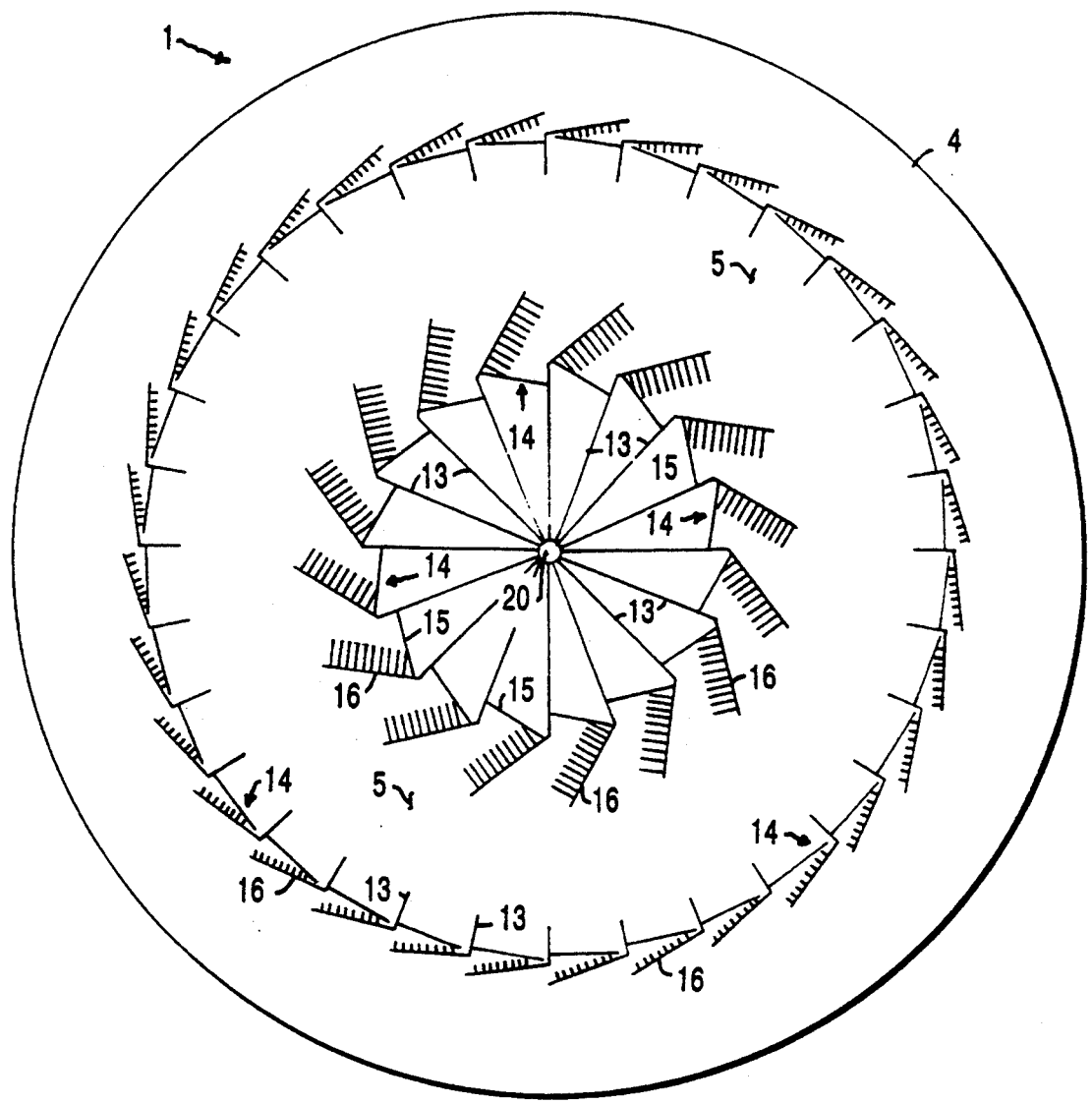
FIG. 2 is a top view of the dome of the steel containment vessel showing the general arrangement of the various elements and components used in the cooling water distribution system of this invention.

In FIG. 2, we have illustrated a preferred embodiment of the arrangement for distributing the cooling water onto he curved surface of dome top 4 of the steel containment vessel 1. The cooling water is introduced from the storage tank by a pipe or pipes into a slotted distributor cylinder 20 positioned just on or above the center of the dome top 4. The slots in the distributor 20 are sized so that the flow from each slot will be substantially uniform even if the distributor 20 is tilted or misaligned. As shown in FIGURE 2, a plurality of steel guide elements 13 are welded to the curved surface of the dome top 4 and extend radially outwardly and downwardly to a first tier of weir boxes 14 from the central distributor cylinder 20, thereby forming sixteen pie-shaped segments or sections on the dome top 4. While this embodiment uses sixteen steel guide elements 13, a larger or lesser number of guide elements could be used without departing from the scope of this invention.

Figure 3:
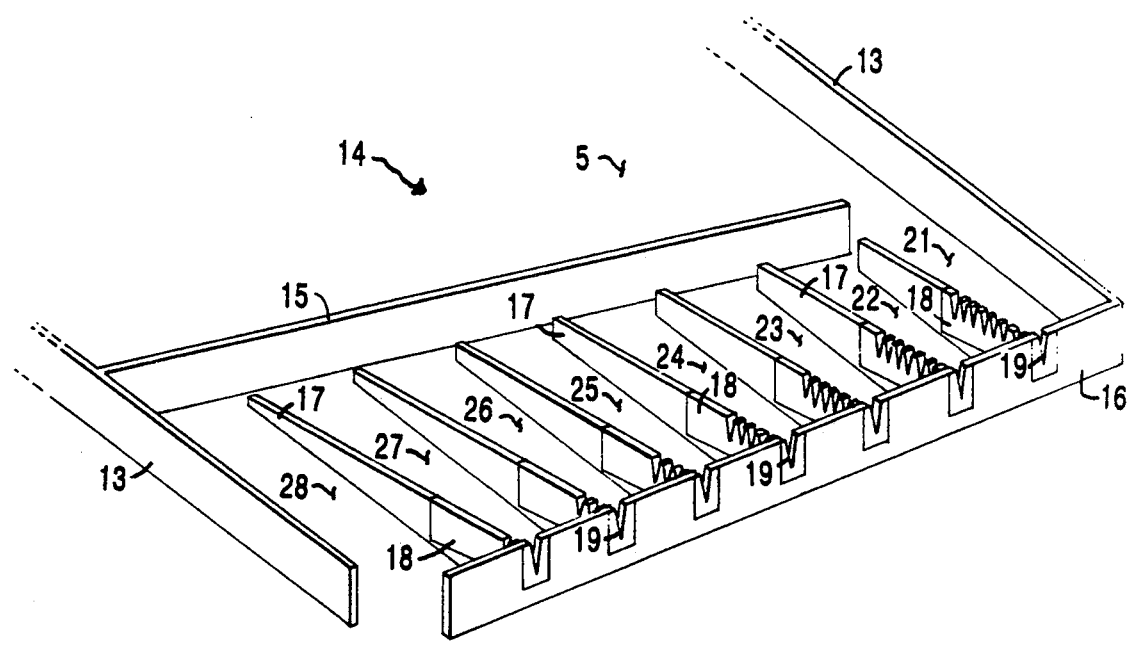
FIG. 3 is an enlarged isometric view of one of the weir boxes used in the cooling water distribution system of this invention.
Figure 4:
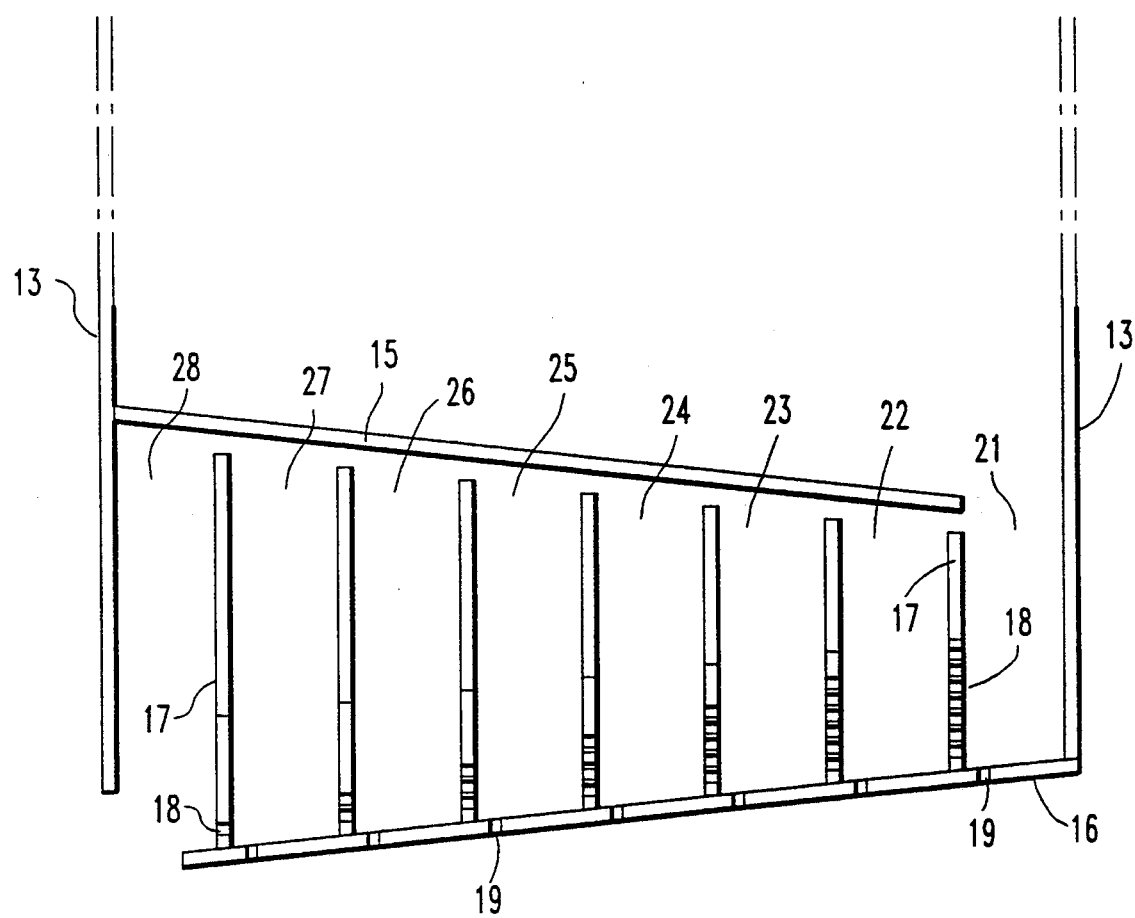
FIG. 4 is a plan view of the weir boxes shown in FIG. 3.

The first tier of weir boxes 14 is comprised of a weir box 14 positioned between each adjacent pair of guide elements 13 at the upper level on the dome top 4 as shown in FIG. 2. As illustrated in FIG. 3 and FIG. 4, each weir box is comprised of an upper collection arm 15 welded to the outer surface 5 of the steel containment vessel 1, and has one end welded to a first guide element 13 and the other end spaced from the second guide element 13. The weir box 14 also has a face plate 16 spaced below the upper collection arm 15, and also welded to the outer surface 5 of the steel containment vessel 1. The face plate 16 has one end welded to the second guide element 13 and the other end spaced from the first guide element 13, as illustrated in FIG. 3. The weir box 14 also has a plurality of spaced, substantially parallel, cross plates 17 extending from the face plate 16 toward the collection arm 15. As shown in FIG. 3 and FIG. 4, each cross plate is provided with a predetermined number of preferably V-shaped weir notches 18 to regulate the cooling water flow.

The cooling water from the distributor 20 flows down the dome top 4 between each pair of radial guide elements 13 Until it reaches the collection arm 15. The collection arm 15 then collects the water and directs it into the first distribution area 21 shown to the right of the weir box 14 in FIG. 3. The water then flows in a sequential series of cascades into distribution areas 22 through 28 from the V-shaped weir notches 18 formed in the cross plates 17. As illustrated in FIG. 3 and FIG. 4, each face plate 16 is also provided with one or more V-shaped weir notches 19 which allow a stream or stream of water to leave the weir box 14 and flow onto a predetermined area of the outer surface 5 of the steel containment vessel 1.

In the example illustrated in FIG. 3 and FIG. 4, the weir box 14 divides the incoming cooling water into eight even streams. The first distribution area 21 has one V-shaped weir notch 19 in the face plate 16 and seven V-shaped weir notches 18 in the cross plate 17. This will allow ⅛ of the water to flow out of the face plate 16 weir 19 and ⅞ of the water to flow out of the distribution area 21 into the distribution area 22. Distribution area 22 has one V-shaped weir 19 notch in the face plate and six V-shaped weir notches 18 in the next cross plate 17. The water flowing onto the outer surface 5 of the steel containment vessel 1 will be 1/7 of the water that flows into the distribution area 22 or ⅛ of the total water collected in the weir box 14.

Likewise, the water flowing through the next cross plate 17 proceeds to the next distribution area 23 where it is again split into two streams with ⅛ of the water which entered the weir box 14 flowing out of the V-shaped weir notch 19 in the face plate 16 and the remainder through the V-shaped weir notches 18 in the next cross plate 17 into the next distribution area 24. Each succeeding distribution area has one less V-shaped weir notch 18 in the cross plate 17 than the preceding distribution area. This arrangement allows for a uniform distribution of cooling water regardless of the flow rate. However, if only one flow rate is provided, the multiple V-shaped weir notches 18 in the cross plates 17 could be provided by one or more weirs of another shape.

It is preferred that the V-shaped weir notches 18 and 19 be formed as separate plates that are adjustably attached to the cross plates 17 or the face plates 16 to allow a field adjustment and leveling of the weir notches 18 and 19 after the cross plates 17 and the face plates 16 are welded to the outer surface 5 of the steel containment vessel 1. Variations of the shape of the dome top 4 during operation will not significantly vary the position of the weir notches 18 and 19.

Additional tiers of weir boxes 14, similar to that described above, are preferably positioned between each pair of radial guide elements 13 at one or more additional levels further down the outer steel surface 5 of the steel containment vessel 1 to provide a continuous and uniform film of cooling water over the entire outer surface 5 of the steel containment vessel 1 as required.

In the preferred embodiment for a 130 foot (43 meter) diameter steel vessel with an ellipsoidal shaped dome, the radial guide elements 13 extend from the center of the dome to a first set or tier of weir boxes 14. A second ring of weir boxes are provided at a larger radial distance from the center of the dome. Radial guide elements 13 between the first and second tiers of weir boxes 14 are not provided in this preferred embodiment because the downward slope of the ellipsoidal dome increases with increasing radius from the dome center, such that surface imperfections and/or shape variations in the dome will have less or minimal impact on the direction of the cooling water flow.

While we have shown this invention by illustrating and describing the preferred embodiment of it, we have done this by way of example, and are not to be limited thereby as there are modifications and adaptation that could be made within the teachings of this invention.

We claim:

1. Apparatus for distributing cooling water comprising:
   (a) a downwardly sloping surface;
   (b) a source of cooling water disposed above the sloping surface;
   (c) a plurality of guide elements secured to said surface and extending radially outwardly and downwardly from the source of cooling water,
   (e) a plurality of weir boxes arranged in a tier, each said weir box secured to said surface and extending between a first and second adjacent guide element, each said weir box comprising:
     (1) a collection arm having one end thereof secured to said first guide element and the other end thereof spaced from said second guide element,
     (2) a face plate spaced below said collection arm and having one end thereof secured to said second guide element and the other end thereof spaced from said first guide element,
     (3) a plurality of spaced, substantially parallel, cross plates extending from the said face plate toward the said collection arm, and having one or more weir notches formed therein,
     (4) one or more spaced weir notches formed in said face plate between each adjacent cross plate.

2. The apparatus of claim 1 in which the sloping surface is the outer surface of a containment vessel of a nuclear reactor.

3. The apparatus of claim 1 in which the source of cooling water is a slotted distribution cylinder above said sloping surface.

4. The apparatus of claim 1 in which the guide elements for a first tier of weir boxes are sixteen in number.

5. The apparatus of claim 1 in which a first tier of weir boxes are sixteen in number.

6. The apparatus of claim 1 in which each cross plate has a different number of weir notches formed therein than an adjacent cross plate.

7. The apparatus of claim 1 in which the weir notches are adjustable.

8. The apparatus of claim 1 in which the weir notches are V-shaped.

9. The apparatus of claim 1 in which there are at least two tiers of weir boxes.

10. The apparatus of claim 1 in which the sloping surface is a domed surface.

11. The apparatus of claim 3 wherein a first tier of weir boxes surrounds the distribution cylinder and a second tier of weir boxes spaced from the first tier of weir boxes surrounds the first tier or weir boxes.

12. The apparatus of claim 11 wherein the number of weir boxes in the first tier is twice the number of weir boxes in the second tier.

13. The apparatus of claim 5 wherein a second tier of weir boxes spaced from the first tier has thirty-two weir boxes.

14. The apparatus of claim 6 wherein each crossplate of each weir box has one less weir notch than the previous adjacent crossplate.

* * * * *